(12) United States Patent
Chiu et al.

(10) Patent No.: US 8,636,921 B1
(45) Date of Patent: Jan. 28, 2014

(54) PHOSPHATE PHOSPHOR AND UV LIGHT-EMITTING DEVICE UTILIZING THE SAME

(71) Applicant: Industrial Technology Research Institute, Hsinchu (TW)

(72) Inventors: Yi-Chen Chiu, Hsinchu (TW);
Yao-Tsung Yeh, Taoyuan (TW);
Shyue-Ming Jang, Hsinchu (TW);
Chien-Hao Huang, Dongshi Township (TW); Teng-Ming Chen, Hsinchu (TW);
Kang-Ling Shih, Taipei (TW);
Yen-Ying Kung, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/761,745

(22) Filed: Feb. 7, 2013

(30) Foreign Application Priority Data

Oct. 23, 2012 (TW) .............................. 101139017 A (51) Int. Cl.
*H01J 1/63* (2006.01)

(52) U.S. Cl.
USPC ................... 252/301.4 R; 313/486; 313/487; 252/301.6 F (58) Field of Classification Search
USPC ............. 252/301.4 R, 301.6 F; 313/486–512; 445/24–25
See application file for complete search history.

(56) References Cited

U.S. PATENT DOCUMENTS

| | | |
|---|---|---|
| 3,417,027 A | 12/1968 | Wanmaker et al. |
| 3,542,690 A | 11/1970 | Borchardt |
| 4,222,890 A | 9/1980 | Takahara et al. |
| 4,764,301 A | 8/1988 | Awazu et al. |
| 4,931,652 A | 6/1990 | Nakamura |
| 5,154,852 A | 10/1992 | Chau |
| 5,156,764 A | 10/1992 | Kaneda et al. |
| 5,422,040 A | 6/1995 | Maofu et al. |
| 5,592,052 A | 1/1997 | Maya et al. |
| 5,738,985 A | 4/1998 | Miles et al. |
| 5,952,253 A | 9/1999 | Dejneka et al. |
| 6,156,496 A | 12/2000 | Miles et al. |
| 6,190,780 B1 | 2/2001 | Shoji et al. |
| 6,579,674 B2 | 6/2003 | Miles et al. |

(Continued)

FOREIGN PATENT DOCUMENTS

| | | |
|---|---|---|
| CA | 473094 A | 4/1951 |
| CA | 504902 A | 8/1954 |

(Continued)

OTHER PUBLICATIONS

Hong et al., "Crystal Structure and Fluorescence Lifetime of Potassium Neodymium Orthophosphate, K3Nd(PO4)2, A New Laser Material", Mat. Res. Bull. vol. 11, 1976, pp. 421-428.

(Continued)

*Primary Examiner* — Tracie Y Green
(74) *Attorney, Agent, or Firm* — Birch, Stewart, Kolasch & Birch, LLP (57) ABSTRACT

Disclosed is a phosphor having a formula of $M_{3-2x}M'_x(M''_{1-y-z}Pr_yGd_z)(PO_4)_2$. M is Li, Na, K, or combinations thereof. M' is Ca, Sr, Ba, Mg, Zn, or combinations thereof. M'' is Sc, Y, La, Lu, Al, Ga, In, or combinations thereof. $0 \le x \le 1$, $0 < y \le 0.15$, $0 < z \le 0.7$. The phosphor can be collocated with an excitation light source to construct a UV light-emitting device, wherein the excitation light source emits light with a wavelength of 140 nm to 240 nm.

9 Claims, 14 Drawing Sheets

(56) References Cited

U.S. PATENT DOCUMENTS

| | | |
|---|---|---|
| 6,613,248 B2 | 9/2003 | Setlur et al. |
| 6,623,961 B2 | 9/2003 | Miles et al. |
| 6,667,152 B2 | 12/2003 | Miles et al. |
| 6,777,179 B2 | 8/2004 | Miles et al. |
| 6,824,976 B1 | 11/2004 | Miles et al. |
| 6,953,952 B2 | 10/2005 | Asakawa |
| 7,138,757 B2 | 11/2006 | Tóth et al. |
| 7,255,812 B2 | 8/2007 | McSweeney et al. |
| 7,396,491 B2 | 7/2008 | Marking et al. |
| 7,497,974 B2 | 3/2009 | Fan et al. |
| 7,723,740 B2 | 5/2010 | Takashima et al. |
| 7,854,859 B2 | 12/2010 | Kameshima et al. |
| 8,158,027 B2 | 4/2012 | Chiu et al. |
| 2002/0177551 A1 | 11/2002 | Terman |
| 2004/0053245 A1 | 3/2004 | Tang et al. |
| 2004/0214783 A1 | 10/2004 | Terman |
| 2005/0156496 A1 | 7/2005 | Takashima et al. |
| 2005/0168125 A1 | 8/2005 | Srivastava et al. |
| 2005/0277216 A1 | 12/2005 | Asakawa |
| 2006/0243987 A1 | 11/2006 | Lai |
| 2008/0149957 A1 | 6/2008 | Kameshima et al. |
| 2008/0233034 A1 | 9/2008 | Liu et al. |
| 2009/0020897 A1 | 1/2009 | Winkler et al. |
| 2009/0021144 A1 | 1/2009 | Chen et al. |
| 2009/0242839 A1 | 10/2009 | Winkler et al. |
| 2009/0243467 A1 | 10/2009 | Shimizu et al. |
| 2010/0061077 A1 | 3/2010 | Winkler et al. |
| 2010/0181580 A1 | 7/2010 | Masuda |
| 2010/0187976 A1 | 7/2010 | Winkler |
| 2011/0186887 A1 | 8/2011 | Trottier et al. |
| 2011/0215348 A1 | 9/2011 | Trottier et al. |
| 2011/0304261 A1 | 12/2011 | Winkler et al. |
| 2012/0057098 A1 | 3/2012 | Lin et al. |
| 2012/0089180 A1 | 4/2012 | Fathi et al. |
| 2012/0121656 A1 | 5/2012 | Watson et al. |
| 2012/0140438 A1 | 6/2012 | Winkler et al. |
| 2012/0162575 A1 | 6/2012 | Lin et al. |

FOREIGN PATENT DOCUMENTS

| | | |
|---|---|---|
| CA | 517680 A | 10/1955 |
| CA | 561514 A | 8/1958 |
| CA | 780307 A | 3/1968 |
| CA | 830387 A | 12/1969 |
| CN | 101054519 A | 10/2007 |
| DE | 1 572 221 | 3/1970 |
| JP | 2005-220353 A | 8/2005 |
| NL | 7003248 A | 9/1970 |
| TW | 483875 B | 4/2002 |
| TW | M279023 | 10/2005 |
| TW | 200615653 | 5/2006 |
| TW | 200825155 A | 6/2008 |
| TW | 200912475 A | 3/2009 |
| TW | 200930793 A | 7/2009 |
| TW | I326704 | 7/2010 |
| TW | 201032355 A1 | 9/2010 |
| TW | 201211632 A1 | 3/2012 |
| TW | I366594 | 6/2012 |
| TW | 201227072 A1 | 7/2012 |
| WO | WO 00/01784 A1 | 1/2000 |

OTHER PUBLICATIONS

Ju et al., "A reddish orange-emitting stoichiometric phosphor $K_3Eu(PO_4)_2$ for white light-emitting diodes", Optics & Laser Technology, 44, 2012, pp. 39-42.

Kharsika et al., "Luminescence of $Eu^{3+}$-Activated Potassium Scandium and Potassium Yttrium Phosphate Vanadates", Inorganic Materials, vol. 37, No. 8, 2001, pp. 831-835.

Mikhailik et al., "Efficient VUV sensitization of $Eu3+$ emission by $Tb3+$ in potassium rare-earth double phosphate", Phys. Status Solidi RRL 3, No. 1, 2009, pp. 13-15.

Tie et al., "Investigation on the Luminescence of $Ln3+$(Ln=Eu, Gd, and Dy) in Hexagonal $KCaR(PO_4)_2$ Phosphates (R=Gd, Y)", Phys. Stat. Sol. (a) 147, 1995, pp. 267-275.

Tie et al., "Structure and site-symmetry investigation on the hexagonal $KCaY(PO_4)_2$", Journal of Alloys and Compounds, 227, 1995, pp. 1-4.

Wang et al., "Spectroscope properties of $KCaY(PO_4)_2$: $Eu3+$ in vacuum ultraviolet region", Materials Science and Engineering B, 133, 2006, pp. 218-221.

Zhang et al., "Investigation on the luminescence of $Re3+$(RE=Ce, Tb, Eu and Tm) in $KMGd(PO_4)_2$(M=Ca, Sr) phosphates", Optical Materials, 30, 2008, pp. 1848-1853.

Zhang et al., "Vacuum ultraviolet spectroscopic properties of rare earth (RE=Ce, Tb, Eu, Tm, Sm)-doped hexagonal $KCaGd(PO_4)_2$ phosphate", Journal of Appliesd Physics, 102, 2007, 8 pages.

Zhang et al., "VUV-UV spectroscopic properties of $RE(RE3+=Ce$, Eu and Tb)-doped $KMLn(PO_4)_2(M2+=Ca$, Sr; $Ln3+=Y$, La, Lu)", Optical Materials, 32, 2009, pp. 99-103.

PHOSPHATE PHOSPHOR AND UV LIGHT-EMITTING DEVICE UTILIZING THE SAME

CROSS REFERENCE TO RELATED APPLICATIONS

The present application is based on, and claims priority from, Taiwan Application Serial Number 101139017, filed on Oct. 23, 2012, the disclosure of which is hereby incorporated by reference herein in its entirety

TECHNICAL FIELD

The disclosure relates to a phosphor, and in particular to a UV light-emitting device utilizing the same.

BACKGROUND

Excitation and emission properties of inorganic phosphors are mainly determined by host materials, activators, and other dopants. Phosphors composed of different host materials, activators or other dopants may have different luminescent properties, such that the composition is the most important factor in tuning the optoelectronic properties of the phosphors. Mainstream host materials of inorganic phosphors are sulfides, oxides, oxysulfides, or other complex oxides such as silicates, aluminates, phosphates, and the likes. Recently, phosphor development of host materials has partly moved in the direction of nitrides and oxynitrides. The major activators being used are ions of transition-metal elements or rare-earth elements.

Future, light sources should meet the environmental protection requirement of being mercury-less or mercury-free, such that a high-efficiency $Xe_2^*$ excimer lamp will possibly become a mainstream light source in the future. The $Xe_2^*$ excimer lamp should probably collocate with a phosphor to convert light from short-wavelength to long-wavelength. For example, the $Xe_2^*$ excimer lamp emits a vacuum ultraviolet (VUV) light having a wavelength of 172 nm, which can be converted by an appropriate phosphor to emit a UV-B light having a wavelength of 280 to 320 nm or a UV-C light having a wavelength of 200 nm to 280 nm. The UV-B light can be applied in phototherapy such as treating skin diseases such as psoriasis, vitiligo, atopic dermatitis, and the likes. The UV-C light may be applied in disinfection, purification, TOC (total organic compounds) reduction, and the likes. Conventional phosphors excitable by the VUV light from the $Xe_2^*$ excimer lamp are rare, such that developments of novel phosphors are still called for.

SUMMARY

One embodiment of the disclosure provides a phosphor, having the chemical formula: $M_{3-2x}M'_x(M''_{1-y-z}Pr_yGd_z)(PO_4)_2$, wherein M is Li, Na, K, or combinations thereof; M' is Ca, Sr, Ba, Mg, Zn, or combinations thereof; M'' is Sc, Y, La, Lu, Al, Ga, In, or combinations thereof; $0 \leq x \leq 1$; $0 < y \leq 0.15$; and $0 < z \leq 0.7$.

One embodiment of the disclosure provides an ultraviolet light-emitting device, comprising: an excitation light source; and the described phosphor, wherein the excitation light source emits light having a wavelength of 140 nm to 240 nm.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In general, phosphors with a phosphate host material have a wide band gap, and can be doped with different activators to exhibit different excitation and emission characteristics. In short, the phosphate is a multi-purpose host material system. In embodiments of the disclosure, the phosphate MM'M''(PO$_4$)$_2$ or M$_3$M''(PO$_4$)$_2$ is selected as a host material doped with the activators Pr$^{3+}$ and/or and Gd$^{3+}$. M is a monovalent metal element selected from Li, Na, K, or combinations thereof. M' is a divalent metal element selected from Ca, Sr, Ba, Mg, Zn, or combinations thereof. M'' is a trivalent metal element selected from Sc, Y, La, Lu, Al, Ga, In, or combinations thereof. Because Pr$^{3+}$ ion and Gd$^{3+}$ ion have a suitable energy level to emit UV-B light or UV-C light, they can be doped into the phosphate host materials MM'M''(PO$_4$)$_2$ or M$_3$M''(PO$_4$)$_2$ to be applied as a UV light-emitting phosphor. As such, the phosphate doped with Pr$^{3+}$ and Gd$^{3+}$ can be collocated with a Xe$_2$* excimer lamp to complete a UV-B or UV-C light source free of mercury.

In one embodiment, the phosphor has the chemical formula in Formula 1.

$$M_{3-2x}M'_x(M''_{1-y-z}Pr_yGd_z)(PO_4)_2 \qquad \text{(Formula 1)}$$

In Formula 1, M is Li, Na, K, or combinations thereof. M' is Ca, Sr, Ba, Mg, Zn, or combinations thereof. M'' is Sc, Y, La, Lu, Al, Ga, In, or combinations thereof. $0 \le x \le 1$, $0 < y \le 0.15$, and $0 < z \le 0.7$.

Figure 1:
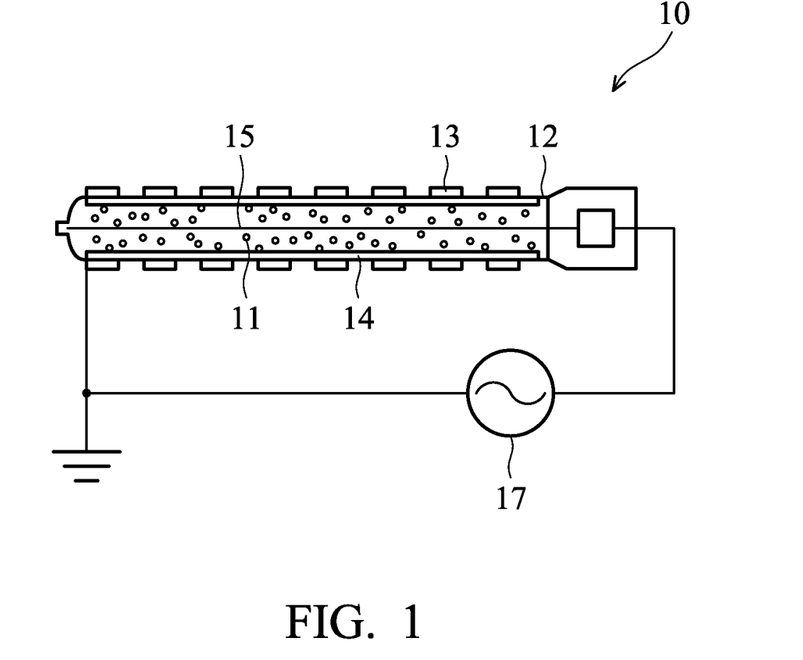
FIG. 1 shows the ultraviolet light-emitting device in one embodiment of the disclosure.

If x in Formula 1 is equal to 0 (x=0), the phosphor will have a formula of M$_3$(M''$_{1-y-z}$Pr$_y$Gd$_z$)(PO$_4$)$_2$, such as Li$_3$(Y$_{1-y-z}$Pr$_y$Gd$_z$)(PO$_4$)$_2$, Na$_3$(Y$_{1-y-z}$Pr$_y$Gd$_z$)(PO$_4$)$_2$, K$_3$(Y$_{1-y-z}$Pr$_y$Gd$_z$)(PO$_4$)$_2$, K$_3$(Ga$_{1-y-z}$Pr$_y$Gd$_z$)(PO$_4$)$_2$, K$_3$(In$_{1-y-z}$Pr$_y$Gd$_z$)(PO$_4$)$_2$, K$_3$(La$_{1-y-z}$Pr$_y$Gd$_z$)(PO$_4$)$_2$, K$_3$(Lu$_{1-y-z}$Pr$_y$Gd$_z$)(PO$_4$)$_2$, or K$_3$(Sc$_{1-y-z}$Pr$_y$Gd$_z$)(PO$_4$)$_2$. If x in Formula 1 is equal to 1 (x=1), the phosphor will have a formula of MM'(M''$_{1-y-z}$Pr$_y$Gd$_z$)(PO$_4$)$_2$, such as KCa(Y$_{1-y-z}$Pr$_y$Gd$_z$)(PO$_4$)$_2$, KSr(Y$_{1-y-z}$Pr$_y$Gd$_z$)(PO$_4$)$_2$, KBa(Y$_{1-y-z}$Pr$_y$Gd$_z$)(PO$_4$)$_2$, KMg(Y$_{1-y-z}$Pr$_y$Gd$_z$)(PO$_4$)$_2$, or KZn(Y$_{1-y-z}$Pr$_y$Gd$_z$)(PO$_4$)$_2$. The phosphor can be excited by light having a wavelength of 140 nm to 240 nm to emit an ultraviolet light having a major emission peak of 240 nm to 400 nm. The phosphor M$_{3-2x}$M'$_x$(M''$_{1-y-z}$Pr$_y$Gd$_z$)(PO$_4$)$_2$ can be applied in an ultraviolet light-emitting device. In one embodiment, the ultraviolet light-emitting device 10 includes a lamp 12 filled with xenon 11, an outer electrode 13 on an outer surface of the lamp 12, an inner electrode 15 inside the lamp 12, and phosphor 14 (M$_{3-2x}$M'$_x$(M''$_{1-y-z}$Pr$_y$Gd$_z$)(PO$_4$)$_2$) coated on an inner surface of the lamp 12, as shown in FIG. 1. The inner electrode 15 and the outer electrode 13 are connected to a positive electrode and a negative electrode of a high voltage power supply 17, respectively, thereby exciting the xenon to emit light having a wavelength of 140 nm to 240 nm.

In addition, the disclosure also provides a method for manufacturing the described phosphate phosphors. First, (1) a compound containing M and oxygen, (2) a compound containing M' and oxygen, (3) a compound containing M'' and oxygen, (4) (NH$_4$)$_2$HPO$_4$ or (NH$_4$)H$_2$PO$_4$, and (5) a compound containing Pr and oxygen and a compound containing Gd and oxygen were mixed to obtain a mixture. The mixture is then sintered at a temperature of 900° C. to 1300° C. After the mixture is heated to the sintering temperature, the mixture is sintered at the sintering temperature for eight hours to thirty-two hours. According to the embodiments, the compounds containing M and oxygen can be metal oxides, metal carbonates, or metal nitrates of Li, Na, K, or combinations thereof. The compounds containing M' and oxygen can be metal oxides, metal carbonates, or metal nitrates of Ca, Sr, Ba, Mg, Zn, or combinations thereof. The compounds containing M'' and oxygen can be metal oxides, metal carbonates, or metal nitrates of Sc, Y, La, Lu, Al, Ga, In, or combinations thereof. The compound containing Pr and oxygen and the compound containing Gd and oxygen can be metal oxides or metal nitrates.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

Figure 2:
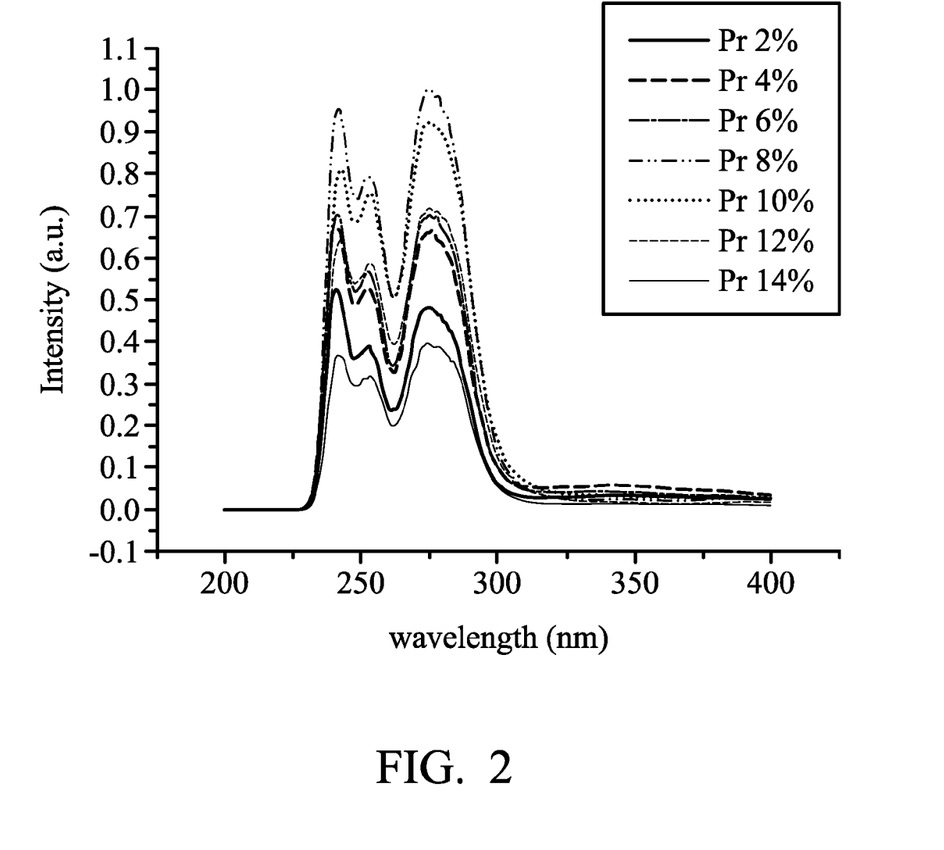
FIG. 2 shows the emission spectra of the phosphors $K_3(Y_{1-y}Pr_y)(PO_4)_2$ having different doping ratios of the activator $Pr^{3+}$, wherein y was 0.02, 0.04, 0.06, 0.08, 0.1, 0.12, and 0.14, respectively, in one embodiment of the disclosure.
Figure 3:
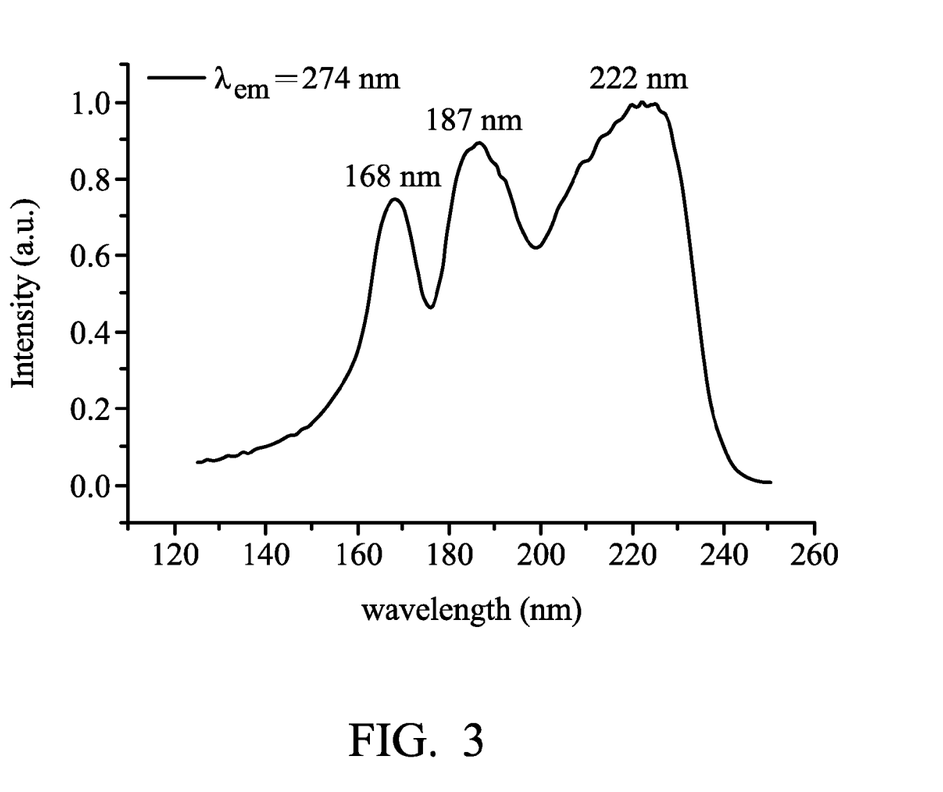
FIG. 3 shows the excitation spectrum of the phosphor $K_3(Y_{0.92}Pr_{0.08})(PO_4)_2$ in one embodiment of the disclosure.

According to the molar ratios of K$_3$(Y$_{1-y}$Pr$_y$)(PO$_4$)$_2$, wherein y was 0.02, 0.04, 0.06, 0.08, 0.1, 0.12, and 0.14, respectively, appropriate stoichiometry of K$_2$CO$_3$, Y$_2$O$_3$, Pr$_2$O$_3$, and (NH$_4$)$_2$HPO$_4$ were evenly mixed and then charged into a crucible. The crucible was then heated in a high-temperature furnace. After sintering at 900° C.-1100° C. in air, the phosphors K$_3$(Y$_{1-y}$Pr$_y$)(PO$_4$)$_2$ having different Y/Pr ratios were prepared. FIG. 2 shows the emission spectra of the phosphors K$_3$(Y$_{1-y}$Pr$_y$)(PO$_4$)$_2$ with different Y/Pr molar ratios, which emit UV light of 230 nm to 300 nm. As shown in FIG. 2, the phosphor doped with 8 mol % of Pr$^{3+}$ had excellent emission intensity. FIG. 3 shows the excitation spectrum of the phosphor K$_3$(Y$_{0.92}$Pr$_{0.08}$)(PO$_4$)$_2$, which has an excitation band of 140 nm to 240 nm.

Figure 4:
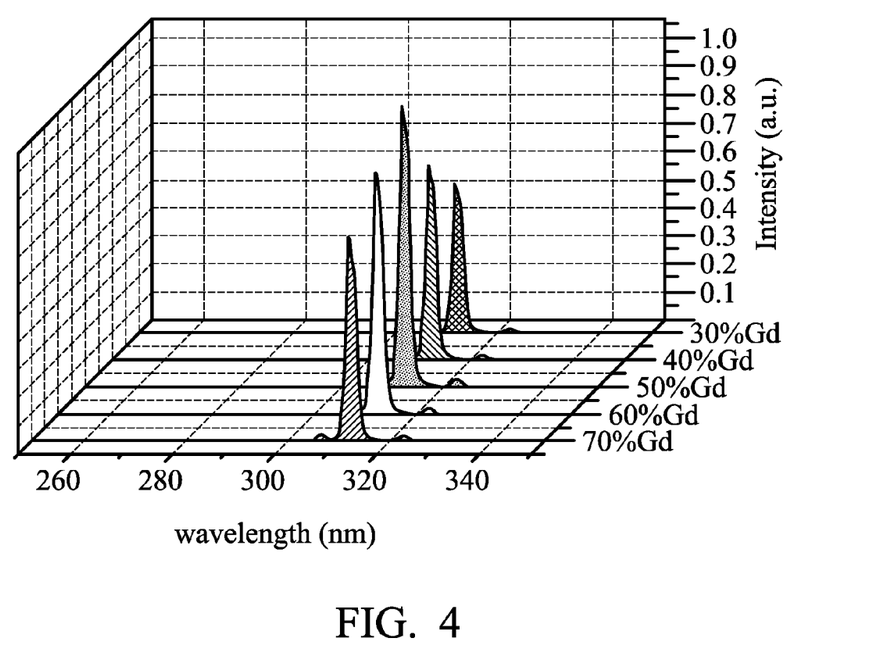
FIG. 4 shows the emission spectra of the phosphors $K_3(Y_{1-z}Gd_z)(PO_4)_2$ having different doping ratios of the activator $Gd^{3+}$, wherein z was 0.3, 0.4, 0.5, 0.6, and 0.7, respectively, in one embodiment of the disclosure.

According to the molar ratios of K$_3$(Y$_{1-z}$Gd$_z$)(PO$_4$)$_2$, wherein z was 0.3, 0.4, 0.5, 0.6, and 0.7, respectively, appropriate stoichiometry of K$_2$CO$_3$, Y$_2$O$_3$, Gd$_2$O$_3$, and (NH$_4$)$_2$HPO$_4$ were evenly mixed and then charged into a crucible. The crucible was then heated in a high-temperature furnace. After sintering at 900° C.-1100° C. in air, the phosphors K$_3$(Y$_{1-z}$Gd$_z$)(PO$_4$)$_2$ having different Y/Gd ratios were prepared. FIG. 4 shows the emission spectra of the phosphors K$_3$(Y$_{1-z}$Gd$_z$)(PO$_4$)$_2$ with different Y/Gd molar ratios, which emit UV light of 300 nm to 330 nm. As shown in FIG. 4, the phosphor doped with 50 mol % of Gd$^{3+}$ had excellent emission intensity.

Figure 5:
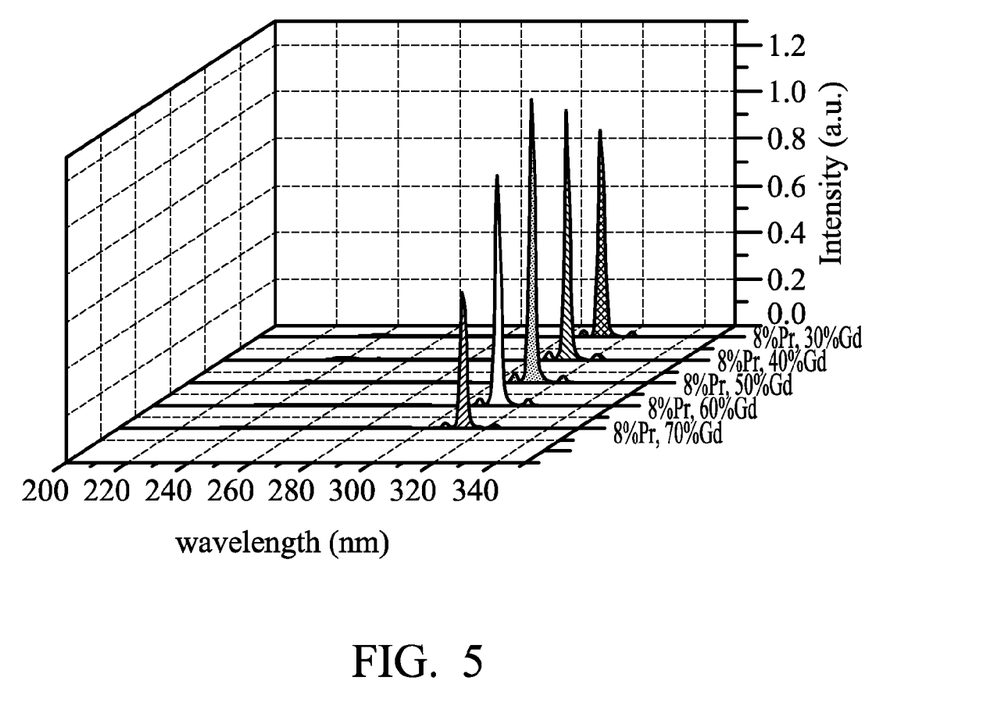
FIG. 5 shows the emission spectra of the phosphors $K_3(Y_{0.92-z}Pr_{0.08}Gd_z)(PO_4)_2$ having different doping ratios of the activator $Gd^{3+}$, wherein z was 0.3, 0.4, 0.5, 0.6, and 0.7, respectively, in one embodiment of the disclosure.
Figure 6:
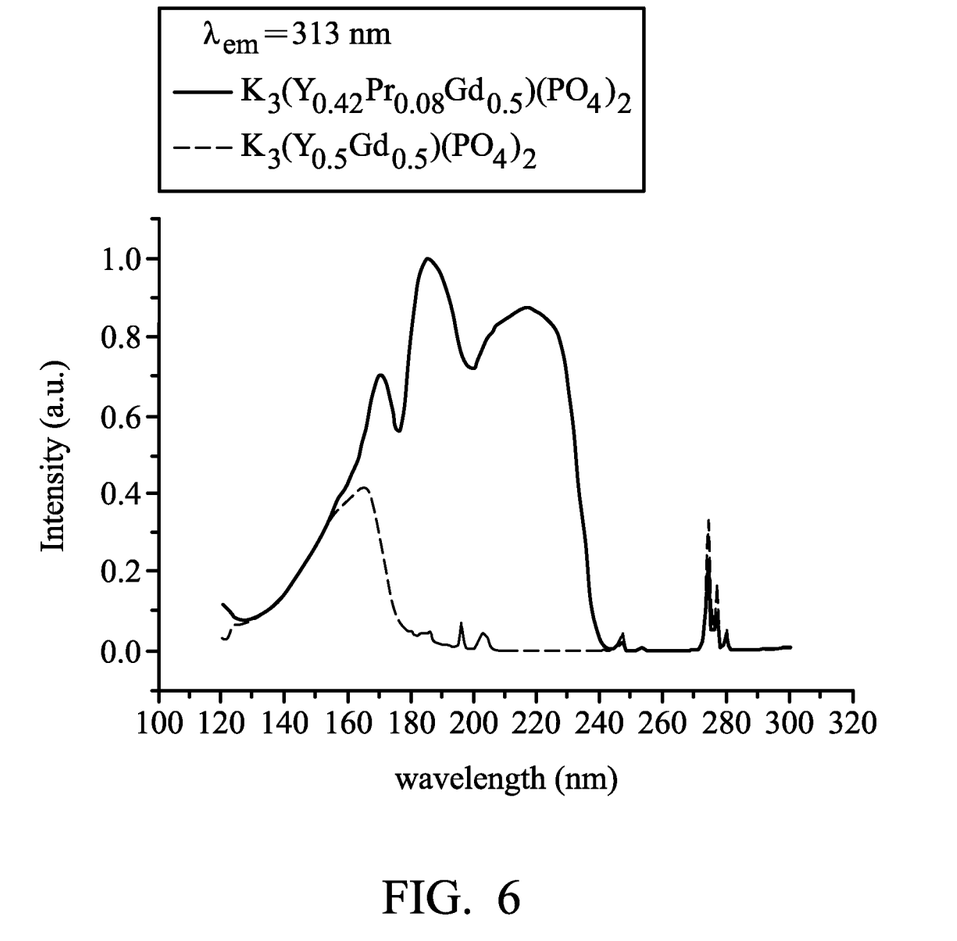
FIG. 6 shows the excitation spectra comparison of the phosphors $K_3(Y_{0.42}Pr_{0.08}Gd_{0.5})(PO_4)_2$ and $K_3(Y_{0.5}Gd_{0.5})(PO_4)_2$ in one embodiment of the disclosure.
Figure 7:
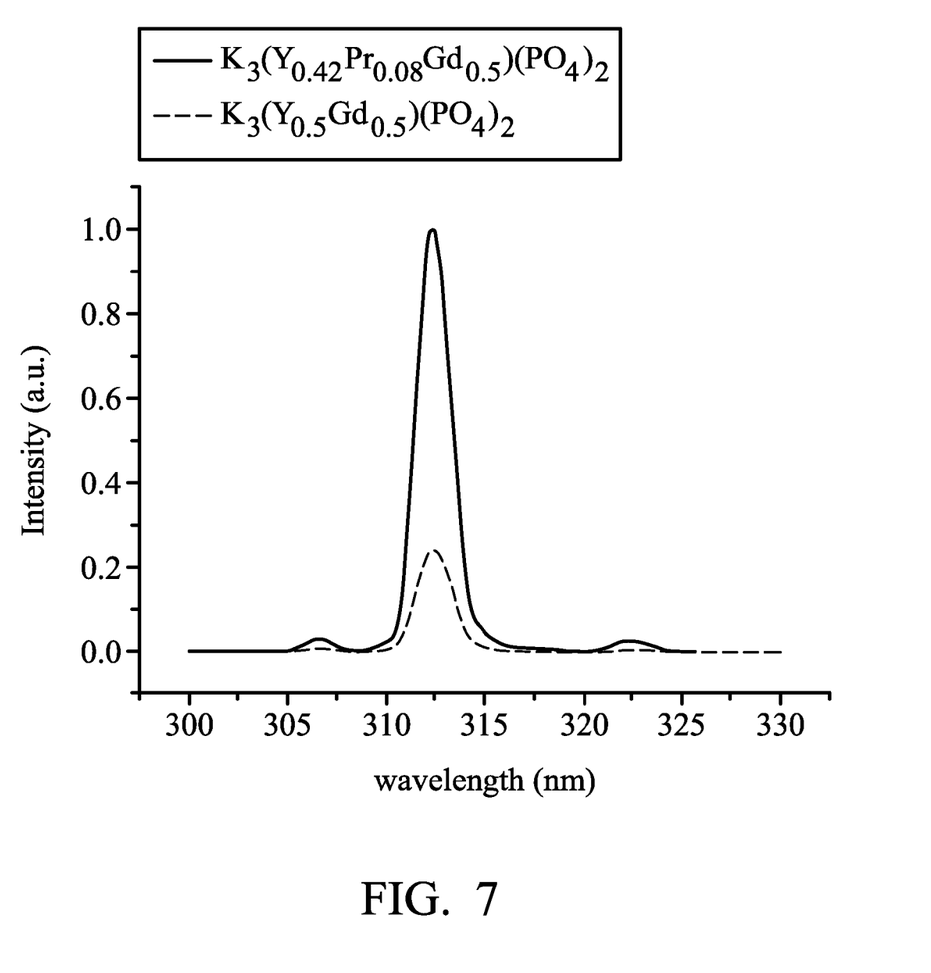
FIG. 7 shows the emission spectra comparison of the phosphors $K_3(Y_{0.42}Pr_{0.08}Gd_{0.5})(PO_4)_2$ and $K_3(Y_{0.5}Gd_{0.5})(PO_4)_2$ in one embodiment of the disclosure.

According to the molar ratios of K$_3$(Y$_{0.92-z}$Pr$_{0.08}$Gd$_z$)(PO$_4$)$_2$, wherein the doping ratio of Pr$^{3+}$ was a constant of 8 mol % and the doping ratio of Gd$^{3+}$ (z) was changeable, appropriate stoichiometry of K$_2$CO$_3$, Y$_2$O$_3$, Pr$_2$O$_3$, Gd$_2$O$_3$, and (NH$_4$)$_2$HPO$_4$ were evenly mixed and then charged into a crucible. The crucible was then heated in a high-temperature furnace. After sintering at 900° C.-1100° C. in air, the phosphors K$_3$(Y$_{0.92-z}$Pr$_{0.008}$Gd$_z$)(PO$_4$)$_2$ having different Y/Gd ratios were prepared. FIG. 5 shows the emission spectra of the phosphors K$_3$(Y$_{0.92-z}$Pr$_{0.08}$Gd$_z$)(PO$_4$)$_2$ with different Y/Gd molar ratios, which emit UV light of 300 nm to 330 nm. As shown in FIG. 5, the phosphor doped with 8 mol % of Pr$^{3+}$ and 50 mol % of Gd$^{3+}$ had excellent emission intensity. FIGS. 6 and 7 show the comparison between the luminescence spectra of the phosphors K$_3$(Y$_{0.42}$Pr$_{0.08}$Gd$_{0.5}$)(PO$_4$)$_2$, and K$_3$(Y$_{0.5}$Gd$_{0.5}$)(PO$_4$)$_2$, respectively. As shown in FIG. 7, the phosphor doped with Pr$^{3+}$ and Gd$^{3+}$ has an emission intensity largely greater than that of the phosphor doped with only Gd$^{3+}$. In addition, the phosphor doped with Pr$^{3+}$ and Gd$^{3+}$ has an excitation band wider than that of the phosphor doped with only Gd$^{3+}$.

Figure 8:
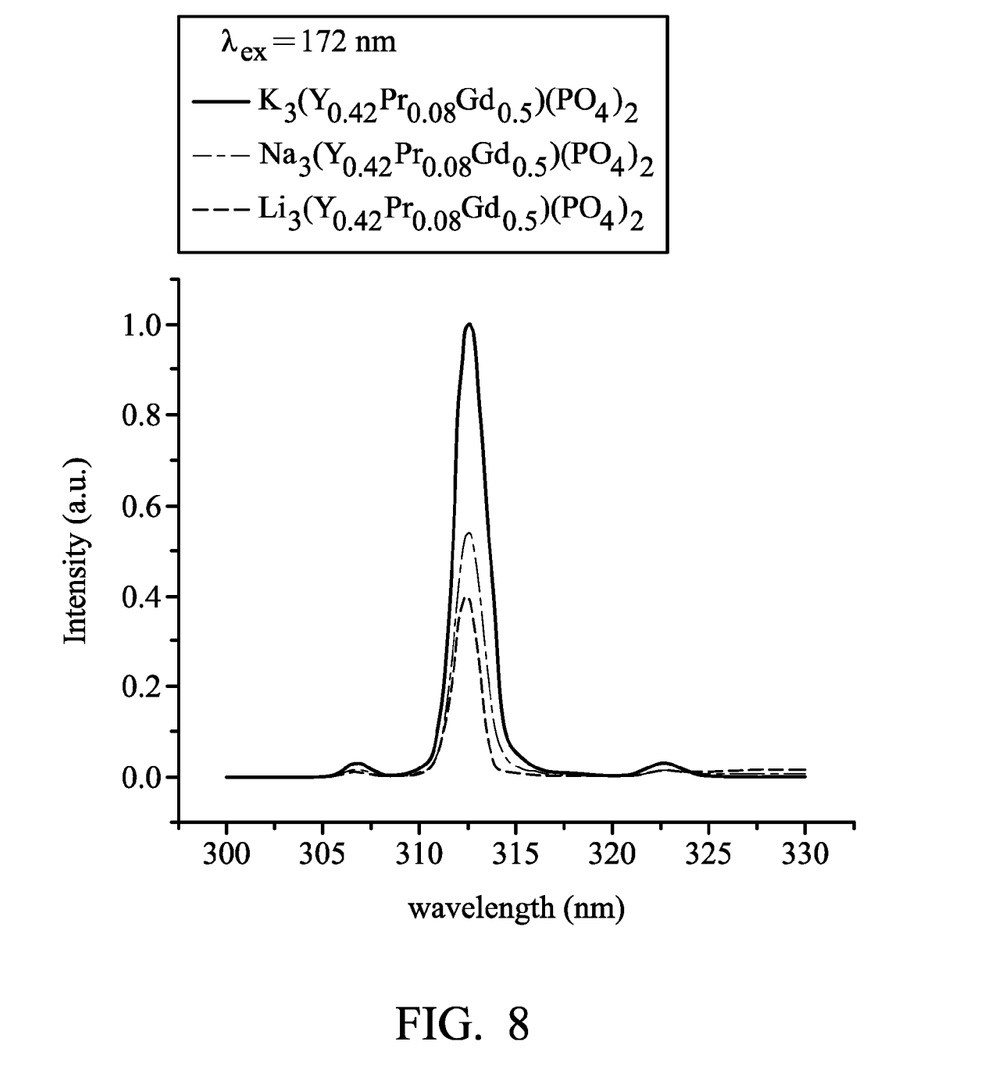
FIG. 8 shows the emission spectra comparison of the phosphors $Li_3(Y_{0.42}Pr_{0.08}Gd_{0.5})(PO_4)_2$, $Na_3(Y_{0.42}Pr_{0.08}Gd_{0.5})(PO_4)_2$, and $K_3(Y_{0.42}Pr_{0.08}Gd_{0.5})(PO_4)_2$ in one embodiment of the disclosure.

UV light-emitting phosphors including other monovalent cations (e.g. Li$^+$ or Na$^+$) could be synthesized by the described steps and suitable starting materials of appropriate molar ratios. FIG. 8 shows the emission spectra comparison of the phosphors Li$_3$(Y$_{0.42}$Pr$_{0.08}$Gd$_{0.5}$)(PO$_4$)$_2$, Na$_3$(Y$_{0.42}$Pr$_{0.08}$Gd$_{0.5}$)(PO$_4$)$_2$, and K$_3$(Y$_{0.42}$Pr$_{0.08}$Gd$_{0.5}$)(PO$_4$)$_2$.

Figure 9:
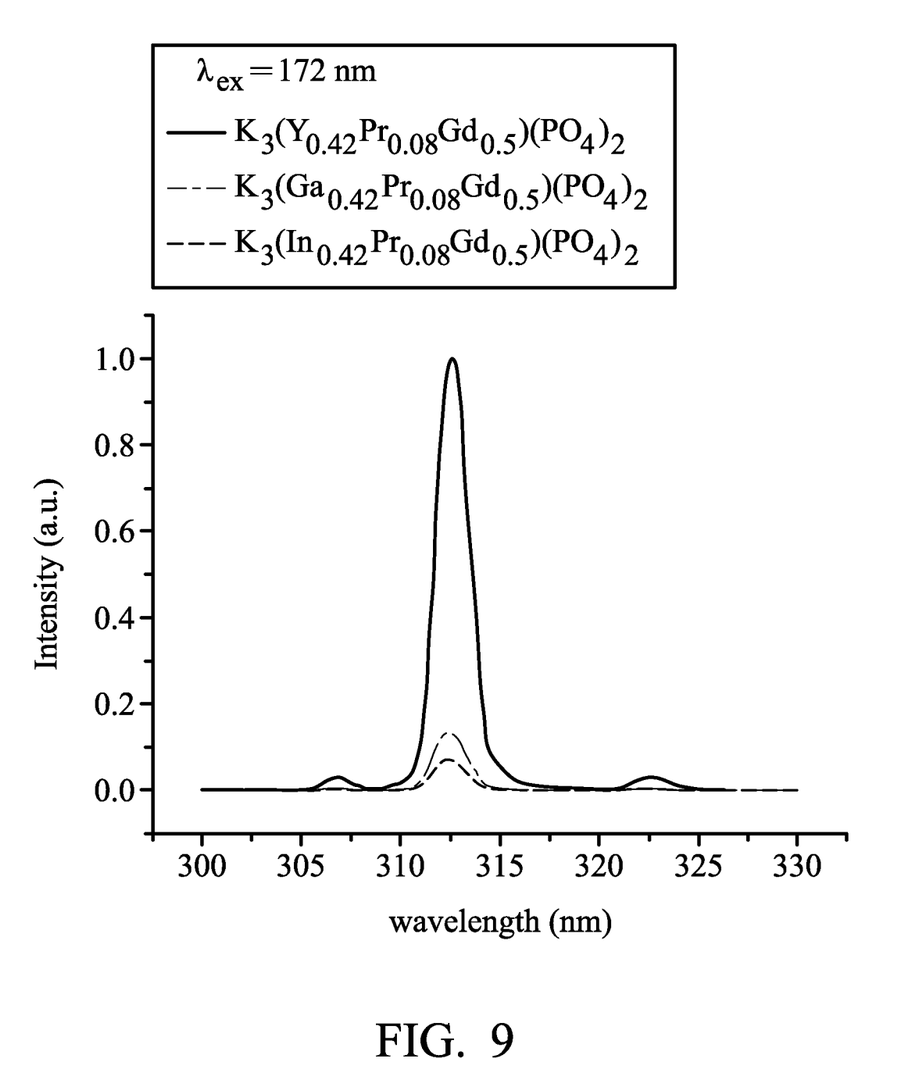
FIG. 9 shows the emission spectra comparison of the phosphors $K_3(Y_{0.42}Pr_{0.08}Gd_{0.5})(PO_4)_2$, $K_3(Ga_{0.42}Pr_{0.08}Gd_{0.5})(PO_4)_2$, and $K_3(In_{0.42}Pr_{0.08}Gd_{0.5})(PO_4)_2$ in one embodiment of the disclosure.
Figure 10:
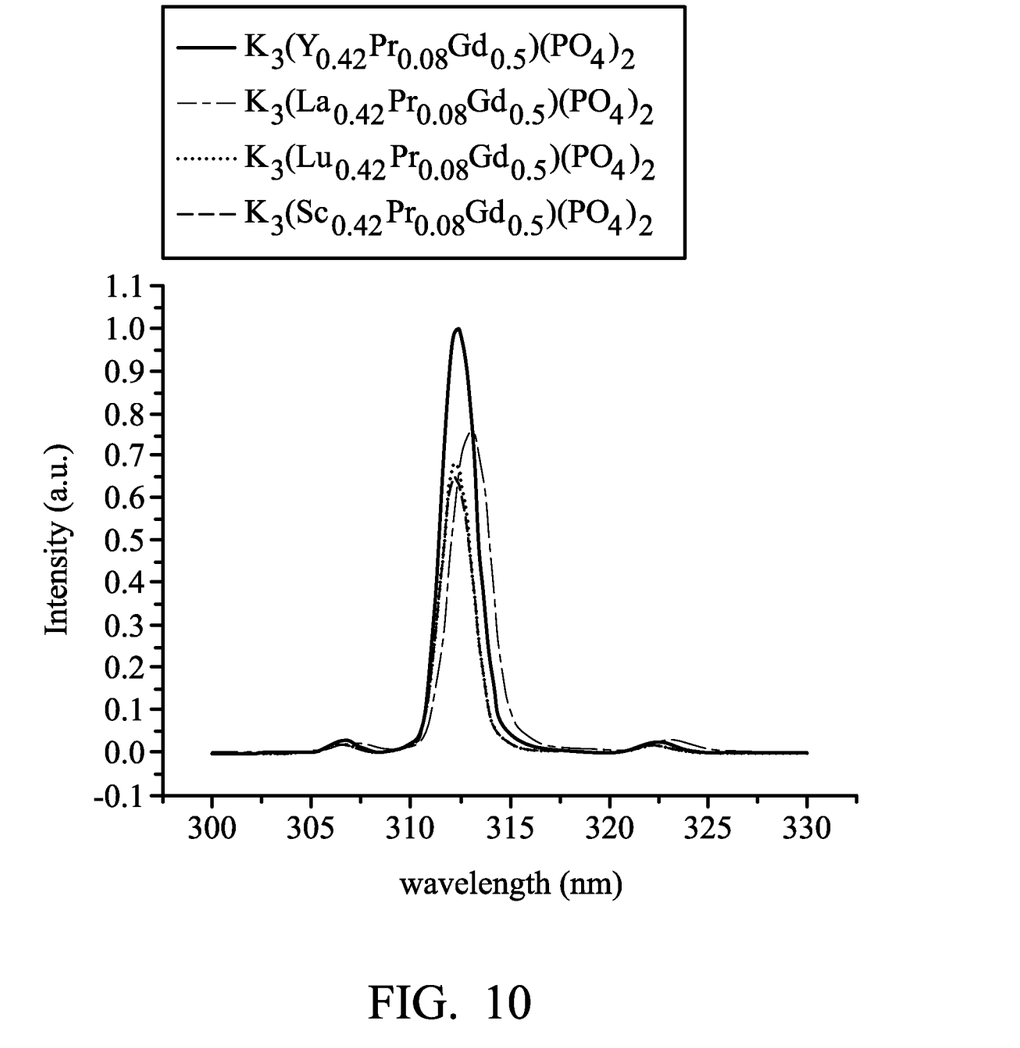
FIG. 10 shows the emission spectra comparison of the phosphors $K_3(Y_{0.42}Pr_{0.08}Gd_{0.5})(PO_4)_2$, $K_3(La_{0.42}Pr_{0.08}Gd_{0.5})(PO_4)_2$, $K_3(Lu_{0.42}Pr_{0.08}Gd_{0.5})(PO_4)_2$, and $K_3(Sc_{0.42}Pr_{0.08}Gd_{0.5})(PO_4)_2$ in one embodiment of the disclosure.

UV light-emitting phosphors including other trivalent cations (e.g. Ga$^{3+}$, In$^{3+}$, La$^{3+}$, Lu$^{3+}$, or Sc$^{3+}$) could be synthesized by the described steps and suitable starting materials of appropriate molar ratios. FIG. 9 shows the emission spectra comparison of the phosphors K$_3$(Y$_{0.42}$Pr$_{0.08}$Gd$_{0.5}$)(PO$_4$)$_2$, K$_3$(Ga$_{0.42}$Pr$_{0.08}$Gd$_{0.5}$)(PO$_4$)$_2$, and K$_3$(In$_{0.42}$Pr$_{0.08}$Gd$_{0.5}$)(PO$_4$)$_2$. FIG. 10 shows an emission spectra comparison of the phosphors K$_3$(Y$_{0.42}$Pr$_{0.08}$Gd$_{0.5}$)(PO$_4$)$_2$, K$_3$(La$_{0.42}$Pr$_{0.08}$Gd$_{0.5}$)(PO$_4$)$_2$, K$_3$(Lu$_{0.42}$Pr$_{0.08}$Gd$_{0.5}$)(PO$_4$)$_2$, and K$_3$(Sc$_{0.42}$Pr$_{0.08}$Gd$_{0.5}$)(PO$_4$)$_2$.

Example 2

Figure 11:
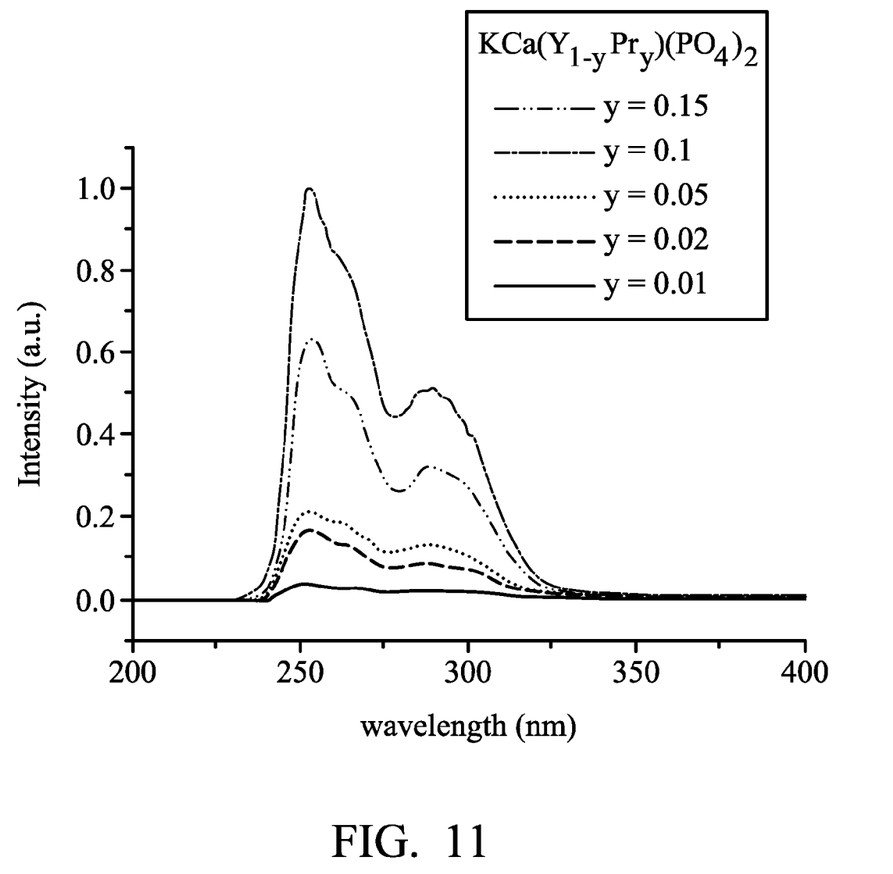
FIG. 11 shows the emission spectra of the phosphors $KCa(Y_{1-y}Pr_y)(PO_4)_2$ having different doping ratios of the activator $Pr^{3+}$, wherein y was 0.01, 0.02, 0.05, 0.1, and 0.15, respectively, in one embodiment of the disclosure.

According to molar ratios of KCa(Y$_{1-y}$Pr$_y$)(PO$_4$)$_2$, wherein y was 0.01, 0.02, 0.05, 0.1, and 0.15, respectively, appropriate stoichiometry of K$_2$CO$_3$, CaCO$_3$, Y$_2$O$_3$, Pr$_2$O$_3$, and (NH$_4$)$_2$HPO$_4$ were evenly mixed and then charged into a crucible. The crucible was then heated in a high-temperature furnace. After sintering at 950° C.-1250° C. in air, the phosphors KCa(Y$_{1-y}$Pr$_y$)(PO$_4$)$_2$ having different Y/Pr ratios were prepared. FIG. 11 shows emission spectra of the phosphors KCa(Y$_{1-y}$Pr$_y$)(PO$_4$)$_2$ with different Y/Pr molar ratios, which emit UV light of 230 nm to 330 nm. As shown in FIG. 11, the phosphor doped with 10 mol % of Pr$^{3+}$ had excellent emission intensity.

Figure 12:
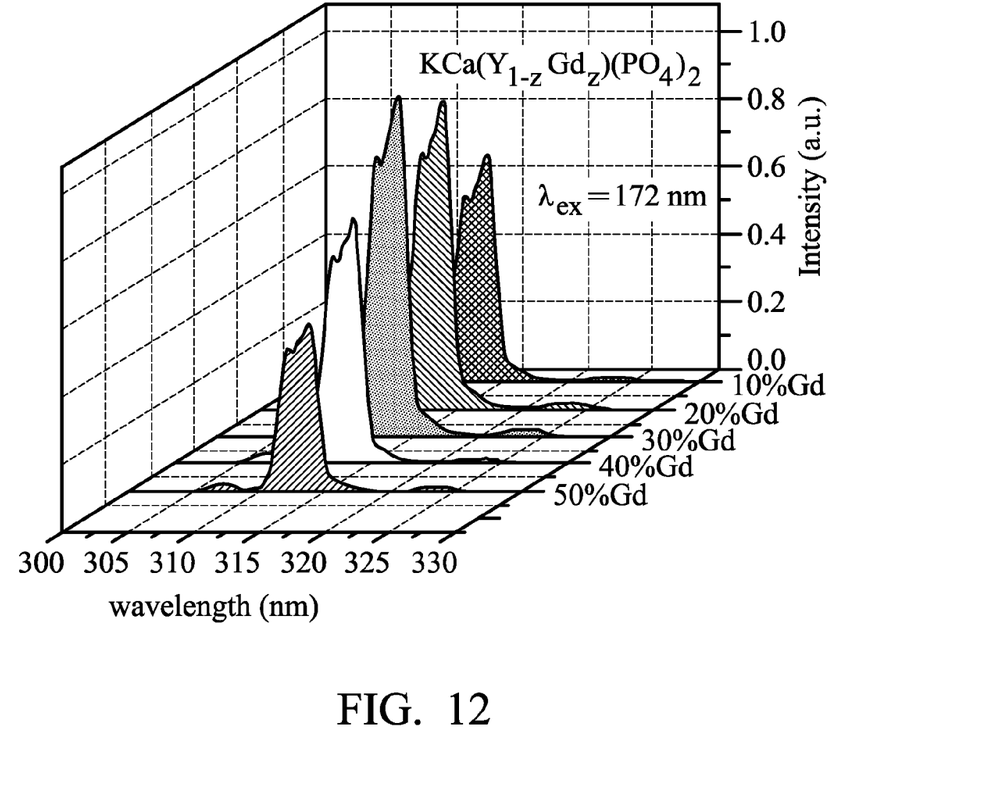
FIG. 12 shows the emission spectra of the phosphors $KCa(Y_{1-z}Gd_z)(PO_4)_2$ having different doping ratios of the activator $Gd^{3+}$, wherein z was 0.1, 0.2, 0.3, 0.4, and 0.5, respectively, in one embodiment of the disclosure.

According to molar ratios of KCa(Y$_{1-z}$Gd$_z$)(PO$_4$)$_2$, wherein z was 0.1, 0.2, 0.3, 0.4, and 0.5, respectively, appropriate stoichiometry of K$_2$CO$_3$, CaCO$_3$, Y$_2$O$_3$, Gd$_2$O$_3$, and (NH$_4$)$_2$HPO$_4$ were evenly mixed and then charged into a crucible. The crucible was then heated in a high-temperature furnace. After sintering at 950° C.-1250° C. in air, the phosphors KCa(Y$_{1-z}$Gd$_z$)(PO$_4$)$_2$ having different Y/Gd ratios were prepared. FIG. 12 shows the emission spectra of the phosphors KCa(Y$_{1-z}$Gd$_z$)(PO$_4$)$_2$ with different Y/Gd molar ratios, which emit UV light of 300 nm to 330 nm. As shown in FIG. 12, the phosphor doped with 30 mol % of Gd$^{3+}$ had excellent emission intensity.

Figure 13:
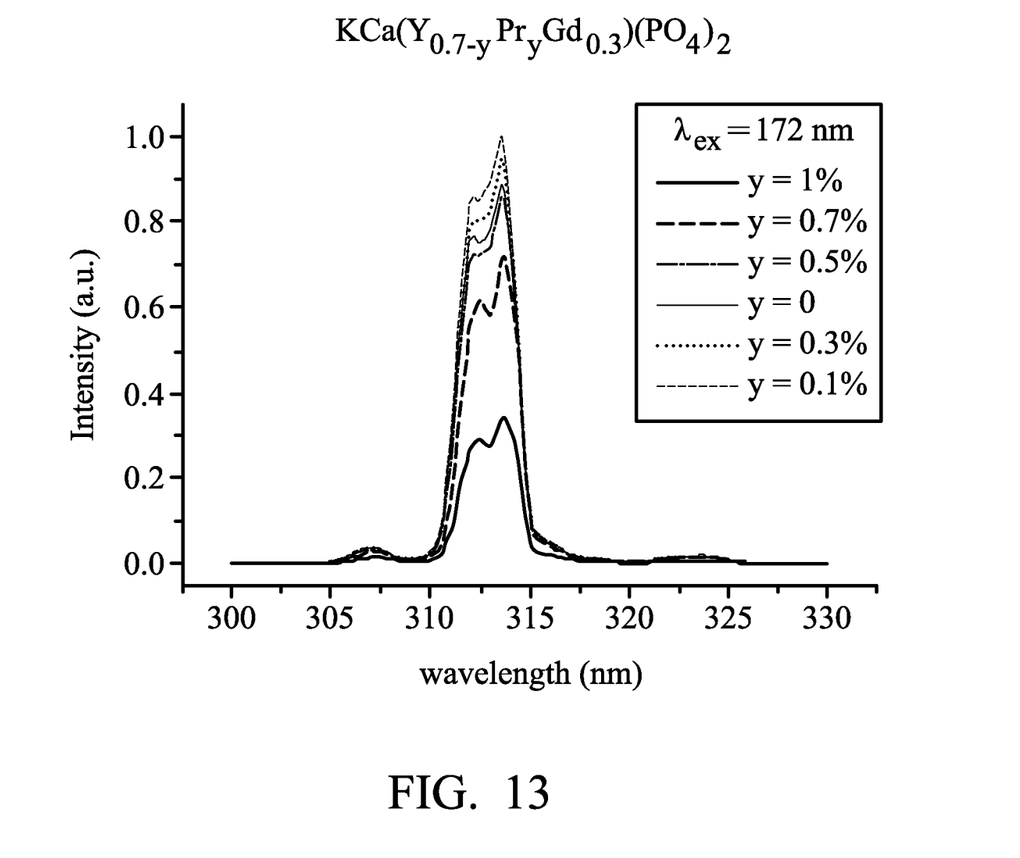
FIG. 13 shows the emission spectra of the phosphors $KCa(Y_{0.7-y}Pr_yGd_{0.3})(PO_4)_2$ having different doping ratios of the activator $Pr^{3+}$, wherein y was 0, 0.001, 0.003, 0.005, 0.007, and 0.01, respectively, in one embodiment of the disclosure.

According to molar ratios of KCa(Y$_{0.7-y}$Pr$_y$Gd$_{0.3}$)(PO$_4$)$_2$, wherein the doping ratio of Pr$^{3+}$ (y) was changeable and the doping ratio of Gd$^{3+}$ was a constant of 30 mol %, appropriate stoichiometry of K$_2$CO$_3$, CaCO$_3$, Y$_2$O$_3$, Pr$_2$O$_3$, Gd$_2$O$_3$, and (NH$_4$)$_2$HPO$_4$ were evenly mixed and then charged into a crucible. The crucible was then heated in a high-temperature furnace. After sintering at 950° C.-1250° C. in air, the phosphors KCa(Y$_{0.7-y}$Pr$_y$Gd$_{0.3}$)(PO$_4$)$_2$ having different Y/Pr ratios were prepared. FIG. 13 shows the emission spectra of the phosphors KCa(Y$_{0.7-y}$Pr$_y$Gd$_{0.3}$)(PO$_4$)$_2$ with different Y/Pr molar ratios, which emit UV light of 305 nm to 315 nm. As shown in FIG. 13, the phosphor doped with 0.1 mol % of Pr$^{3+}$ and 30 mol % of Gd$^{3+}$ had excellent emission intensity.

Figure 14:
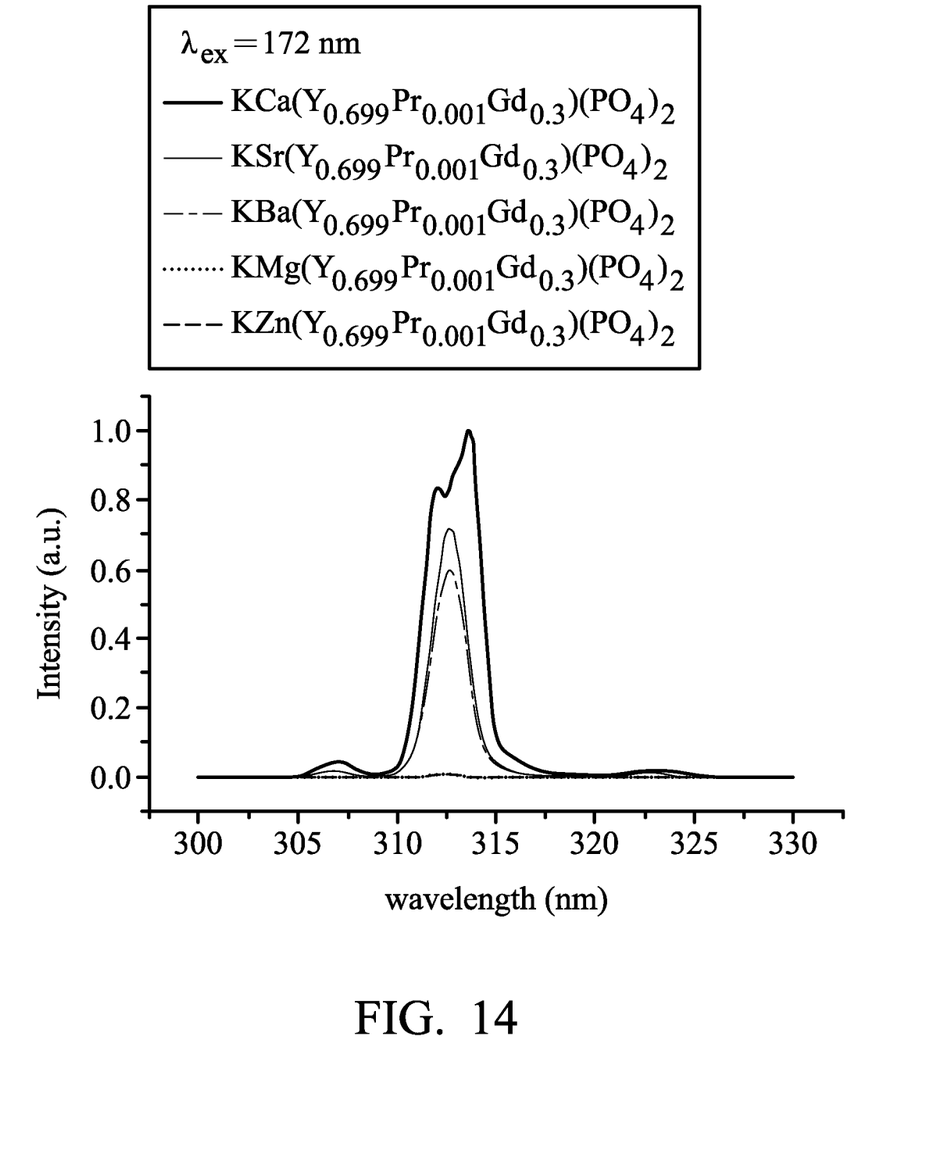
FIG. 14 shows the emission spectra comparison of the phosphors $KCa(Y_{0.699}Pr_{0.001}Gd_{0.3})(PO_4)_2$, $KSr(Y_{0.699}Pr_{0.001}Gd_{0.3})(PO_4)_2$, $KBa(Y_{0.699}Pr_{0.001}Gd_{0.3})(PO_4)_2$, $KMg(Y_{0.699}Pr_{0.001}Gd_{0.3})(PO_4)_2$, and $KZn(Y_{0.699}Pr_{0.001}Gd_{0.3})(PO_4)_2$ in one embodiment of the disclosure.

UV light-emitting phosphors including other divalent cations (e.g. Sr$^{2+}$, Ba$^{2+}$, Mg$^{2+}$, or Zn$^{2+}$) could be synthesized by the described steps and suitable starting materials of appropriate molar ratios. FIG. 14 shows the emission spectra comparison of the phosphors KCa(Y$_{0.699}$Pr$_{0.001}$Gd$_{0.3}$)(PO$_4$)$_2$, KSr(Y$_{0.699}$Pr$_{0.001}$Gd$_{0.3}$)(PO$_4$)$_2$, KBa(Y$_{0.699}$Pr$_{0.001}$Gd$_{0.3}$)(PO$_4$)$_2$, KMg(Y$_{0.699}$Pr$_{0.001}$Gd$_{0.3}$)(PO$_4$)$_2$, and KZn(Y$_{0.699}$Pr$_{0.001}$Gd$_{0.3}$)(PO$_4$)$_2$.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A phosphor, having the chemical formula:
   M$_{3-2x}$M'$_x$(M''$_{1-y-z}$Pr$_y$Gd$_z$)(PO$_4$)$_2$,
   wherein M is Li, Na, K, or combinations thereof;
   M' is Ca, Sr, Ba, Mg, Zn, or combinations thereof;
   M'' is Sc, Y, La, Lu, Al, Ga, In, or combinations thereof;
   0≤x≤1;
   0<y≤0.15; and
   0<z≤0.7.

2. The phosphor as claimed in claim 1, being excited by light having a wavelength of 140 nm to 240 nm to emit an ultraviolet light having a major emission peak of 240 nm to 400 nm.

3. The phosphor as claimed in claim 1, having the chemical formula:
   M$_3$(M''$_{1-y-z}$Pr$_y$Gd$_z$)(PO$_4$)$_2$.

4. The phosphor as claimed in claim 3, having the chemical formula:
   Li$_3$(Y$_{1-y-z}$Pr$_y$Gd$_z$)(PO$_4$)$_2$, Na$_3$(Y$_{1-y-z}$Pr$_y$Gd$_z$)(PO$_4$)$_2$, or K$_3$(Y$_{1-y-z}$Pr$_y$Gd$_z$)(PO$_4$)$_2$.

5. The phosphor as claimed in claim 3, having the chemical formula:
   K$_3$(Y$_{1-y-z}$Pr$_y$Gd$_z$)(PO$_4$)$_2$, K$_3$(Ga$_{1-y-z}$Pr$_y$Gd$_z$)(PO$_4$)$_2$, K$_3$(In$_{1-y-z}$Pr$_y$Gd$_z$)(PO$_4$)$_2$, K$_3$(La$_{1-y-z}$Pr$_y$Gd$_z$)(PO$_4$)$_2$, K$_3$(Lu$_{1-y-z}$Pr$_y$Gd$_z$)(PO$_4$)$_2$, or K$_3$(Sc$_{1-y-z}$Pr$_y$Gd$_z$)(PO$_4$)$_2$.

6. The phosphor as claimed in claim 1, having the chemical formula:
   MM'(M''$_{1-y-z}$Pr$_y$Gd$_z$)(PO$_4$)$_2$.

7. The phosphor as claimed in claim 6, having the chemical formula:
   KCa(Y$_{1-y-z}$Pr$_y$Gd$_z$)(PO$_4$)$_2$, KSr(Y$_{1-y-z}$Pr$_y$Gd$_z$)(PO$_4$)$_2$, KBa(Y$_{1-y-z}$Pr$_y$Gd$_z$)(PO$_4$)$_2$, KMg(Y$_{1-y-z}$Pr$_y$Gd$_z$)(PO$_4$)$_2$, or KZn(Y$_{1-y-z}$Pr$_y$Gd$_z$)(PO$_4$)$_2$.

8. An ultraviolet light-emitting device, comprising:
   an excitation light source; and
   the phosphor as claimed in claim 1,
   wherein the excitation light source emits light having a wavelength of 140 nm to 240 nm.

9. The ultraviolet light-emitting device as claimed in claim 8, wherein the excitation light source comprises a Xe$_2$* excimer lamp.

* * * * *